United States Patent
Malloy et al.

(10) Patent No.: US 10,769,665 B2
(45) Date of Patent: Sep. 8, 2020

(54) SYSTEMS AND METHODS FOR TRANSMITTING CONTENT BASED ON CO-LOCATION

(71) Applicant: comScore, Inc., Reston, VA (US)

(72) Inventors: Matthew L. Malloy, Reston, VA (US); Paul Barford, Reston, VA (US)

(73) Assignee: comScore, Inc., Reston, VA (US)

(*) Notice: Subject to any disclaimer, the term of this patent is extended or adjusted under 35 U.S.C. 154(b) by 331 days.

(21) Appl. No.: 15/369,512

(22) Filed: Dec. 5, 2016

(65) Prior Publication Data

US 2018/0158104 A1 Jun. 7, 2018

(51) Int. Cl.
G06Q 30/02 (2012.01)
H04W 4/02 (2018.01)
H04L 29/08 (2006.01)

(52) U.S. Cl.
CPC ........ *G06Q 30/0261* (2013.01); *H04L 67/18* (2013.01); *H04W 4/023* (2013.01)

(58) Field of Classification Search
CPC .... G06Q 30/02; G06Q 50/01; G06Q 30/0261; H04W 4/02; H04W 4/20; H04W 4/021; H04W 4/029; H04W 4/80; H04W 72/042; H04W 72/046; H04W 4/06; H04W 72/12; G06F 17/00; G06F 17/30867; G06F 21/55; H04L 67/18; H04L 5/0048; H04L 5/0035; H04L 5/0053; H04L 5/005; H04L 5/0094; H04L 5/0023; H04L 5/001; H04L 5/0057; H04L 63/1425; H04L 63/1441; H04L 2463/141; H04L 63/1483; H04L 67/10; H04B 7/0626; H04B 7/0413
See application file for complete search history.

(56) References Cited

U.S. PATENT DOCUMENTS

| | | | | |
|---|---|---|---|---|
| 10,034,135 | B1* | 7/2018 | Provost | H04W 4/025 |
| 2005/0071417 | A1* | 3/2005 | Taylor | G06Q 30/0261 |
| | | | | 709/200 |
| 2013/0276115 | A1* | 10/2013 | Hu | G06Q 50/01 |
| | | | | 726/23 |
| 2014/0330643 | A1* | 11/2014 | Grigorovici | G06Q 30/0267 |
| | | | | 705/14.52 |
| 2015/0038162 | A1* | 2/2015 | Duleba | H04L 67/18 |
| | | | | 455/456.1 |
| 2015/0081445 | A1* | 3/2015 | Taylor | G06F 16/24578 |
| | | | | 705/14.58 |
| 2016/0307191 | A1* | 10/2016 | Turgeman | G06Q 20/382 |
| 2016/0323239 | A1* | 11/2016 | Cheng | H04L 67/22 |

* cited by examiner

*Primary Examiner* — Chinyere Mpamugo
(74) *Attorney, Agent, or Firm* — BakerHostetler

(57) ABSTRACT

A computerized method of transmitting content to a first device and a second device may include receiving a first identifier and first location data of the first device, and a second identifier and second location data of the second device. The method may include comparing the first location data with the second location data, and generating a co-location score in response to the comparison. The method may include determining that the co-location score is greater than a threshold, and responsively generating household data indicative of a relationship between the first device and the second device. The method may further include generating and transmitting a report indicating the relationship to a content provider that transmits content to the first device and the second device.

17 Claims, 3 Drawing Sheets

SYSTEMS AND METHODS FOR TRANSMITTING CONTENT BASED ON CO-LOCATION

TECHNICAL FIELD

The present disclosure relates generally to systems and methods for generating and transmitting content, and more particularly, to systems and methods for generating and transmitting content based on co-location of devices.

BACKGROUND

The past several years have seen an explosion in the number and variety of internet-connected devices used by individuals on a daily basis. For example, a single person might use a desktop, a laptop, one or more smartphones or tablets, a gaming console, a smart watch, and a smart TV several times a day. As Internet-of-Things (IOT) devices continue to proliferate, the number of internet-connected devices used daily by individuals will grow.

The growth of diverse IOT devices presents a number of challenges. First, ensuring network performance, reliability, and security of the IOT devices will be more difficult because of their prevalence. Second, the notion of user experience will expand to cross device experience. This is exemplified by mechanisms that facilitate coordination between smart phones and smart watches, such as smart hubs and associated control applications for environment management. As a result, it would be desirable to establish user-, household-, and/or community-centric devices, for example, to enhance the experience across devices.

SUMMARY

The foregoing needs are met, to a great extent, by the systems and methods described herein. In one aspect, a computerized method of transmitting content to a first device and a second device may include receiving a first identifier and first location data of the first device, and a second identifier and second location data of the second device. The method may include comparing the first location data with the second location data, and generating a co-location score in response to the comparison. The method may include determining that the co-location score is greater than a threshold, and responsively generating household data indicative of a relationship between the first device and the second device. The method may further include generating and transmitting a report indicating the relationship to a content provider that transmits content to the first device and the second device.

Another aspect is directed to a system including at least one processor, and at least one memory storing instructions that, when executed, cause the at least one processor to perform the method described above. Yet another aspect is directed to a non-transitory computer-readable medium storing instructions which, when executed, cause one or more processors to perform the method described above.

BRIEF DESCRIPTION OF THE DRAWINGS

In order that the disclosure may be readily understood, aspects of this disclosure are illustrated by way of examples in the accompanying drawings.

The same reference numbers are used in the drawings and the following detailed description to refer to the same or similar parts.

DETAILED DESCRIPTION

Systems and methods for generating and transmitting content based on co-location are described. Content may be transmitted based on relationships between pairs of devices that share an IP address at the same time, which is common when two devices are connected to the internet via a single internet connection. For example, the systems and methods may determine a personal (e.g., user) level and/or household-level relationship for two devices based on an IP address, a temporal aspect of the connection, and the number of other connected devices. Specifically, IP co-location can be a strong indicator of a common user and/or household if the IP address is a residential address utilized by a small number of devices, and provided the co-occurrence between the devices persists longitudinally through time. False positive relationships may be mitigated by accounting for both considerations. The described systems and methods may only require a device ID (e.g., a web cookie, advertising ID, or MAC address), an IP address, and a timestamp. Such data is available to web and application ("app") publishers, and other internet entities. However, additional data (e.g., account data and/or panel data) may be acquired to provide more robust analysis.

Figure 1:
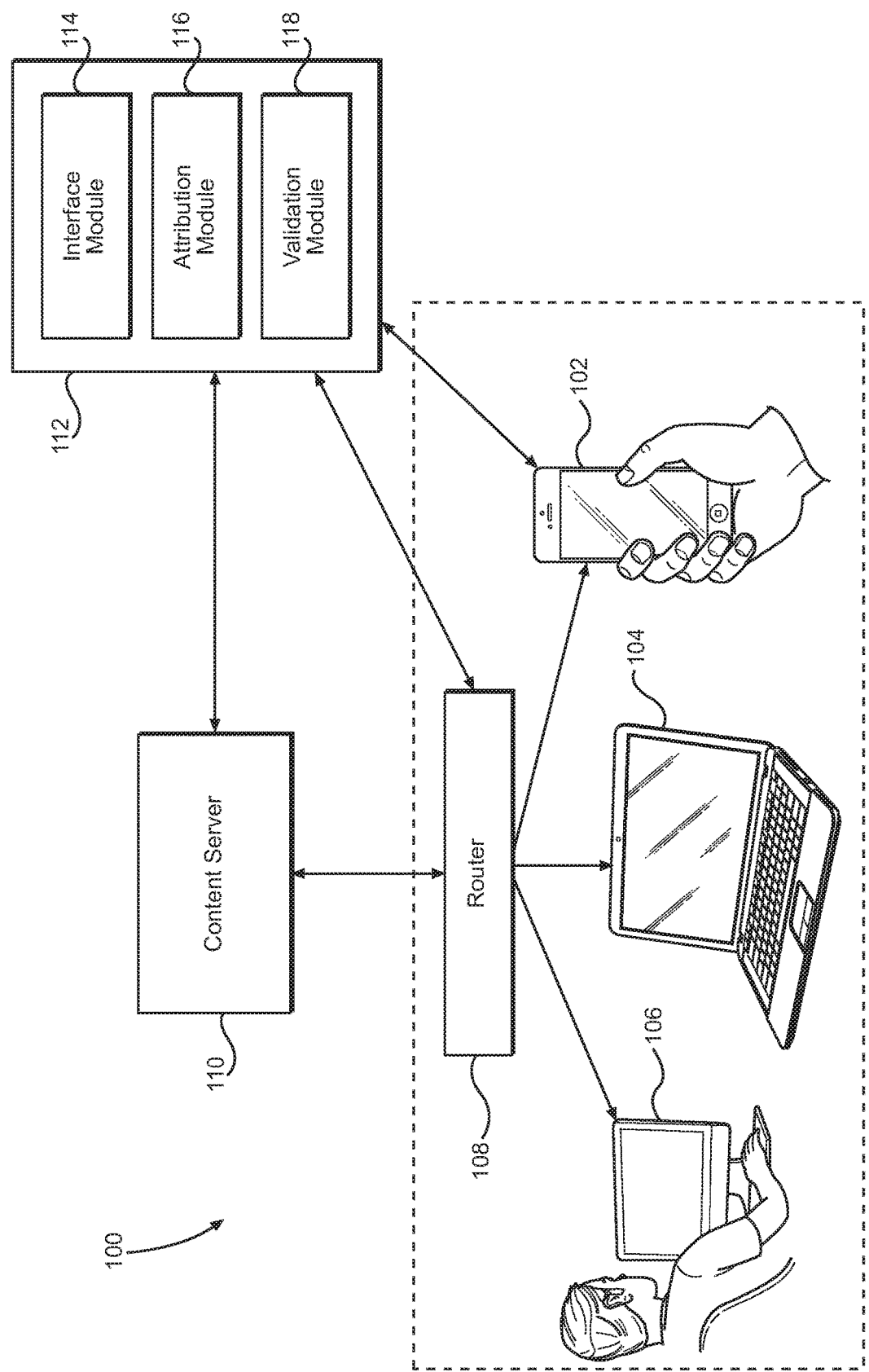
FIG. 1 illustrates an exemplary system that may be used to perform one or more operations of the present disclosure.

FIG. 1 illustrates an exemplary system 100 including hardware and network configurations for transmitting content to one or more devices 102-106 based on IP co-location. As shown, the system 100 may include a router 108, a content provider 110, and an analysis network 112 in communication with one another.

The devices 102-106 may include one or more personal and/or household devices including but not limited to a desktop, a laptop computer, a mobile device, such as a smartphone or a tablet, a smart watch, smart glasses, a gaming console, an over-the-top content (OOT) device, a set top box, a router, a smart TV, a kiosk terminal, a Global Positioning System (GPS) device, and/or other devices. The devices 102-106 may be loaded with an operating system and a web browser configured to render webpages and/or other web or application content from the content provider 110. Exemplary operating systems include Microsoft Windows, Apple OS X, Linux, iOS, and Android, and exemplary web browsers include Internet Explorer, Google Chrome, Mozilla Firefox, and Safari. The devices 102-106 may also be assigned a device identifier, based on one or more of a media access control (MAC) address, a browser cookie stored on the device 102-106, an assigned advertising ID (e.g., Apple's Identifier for Advertisers (IDFA), Google's Advertising ID, and Microsoft's Advertising ID), and/or any other direct (e.g., private IP address) or probabilistic device identifier. Additional exemplary device identifiers may include one or more of a manufacturer and model of the device 102-106, and an app or package used on the device 102-106. The devices 102-106 may also include software configured to acquire global positioning satellite (GPS) data detailing the geographic location of the devices 102-106. The devices 102-106 may further include software configured to track and transmit panel data to the analysis network 112, as further discussed herein.

One or more of the devices 102-106 may be in communication with the Internet via the router 108 connected to an Internet Service Provider ("ISP"), such as when the devices 102-106 are located in a common location. The devices 102-106 may communicate with proxy servers and data servers (e.g., content provider 110) over a network established by the router 108, such that the devices 102-106 may upload and download packets of data to and from the content provider 110 via the router 108. The devices 102-106 may be connected to the router 108 over one or more communication channels (e.g., wired, wireless, or both). For example, the devices 102-106 may be connected to the router 108 by an Ethernet cable and/or via WiFi. The router 108 may be part of a household network, a public network, and/or an office network of varying size. The router 108 may be assigned an internet protocol (IP) address, such as version 4 (IPv4) or version 6 (IPv6). The IP address of the router 108 may be static or dynamic. The IP address of the router 108 may be assigned to the devices 102-106 when connected to the router 108.

The router 108 may have software that receives and transmits panel data of the devices 102-106, that provides ground data for the devices 102-106, as further discussed herein. The router 108 may record an identifier of the devices 102-106 connected to the router 108. The router 108 may also determine the devices 102-106 have a relationship with the household. For example, the router 108 may record and transmit identifiers that are connected to the router 108 for a predetermined period of time (e.g., more than 5 days). This may provide location data for devices 102-106 having a long-term relationship with the household, and determine guest devices that do not have a long-term relationship with the household. It is contemplated the router 108 may be any type of monitoring device, such as a packet monitor or deep packet inspection system, that is connected to a network link that collects packets from which the time, location and device identifier information are extracted.

The content provider(s) 110 may include website owners or content publishers configured to transmit content to and from the devices 102-106, via the router 108. The content provider(s) 110 may include financial institutions (e.g., Bank of America), email providers (e.g., Gmail), search engines (e.g., Google), media streaming entities (e.g., Netflix), and/or news providers (e.g., CNN). The content provider(s) 110 may be in communication with users of the devices 102-106 through publication of websites and/or apps. The content provider 110 may also include a company seeking to market or sell products or services, or an advertisement agency or broker that may direct creatives (e.g., advertisement content) to the devices 102-106. The content provider 110 may publish advertisement content to client devices 102-106 based on cookies detailing a user's web identity. For example, the content provider 110 may include servers from Google AdSense that facilitates targeted publication of advertisement content to users. In some embodiments, the advertisement content may be generated by JavaScript linked and/or embedded in a predetermined location of the webpage, such as banner advertisements.

The analysis network 112 may include one or more processors, computer readable memories, such as hard drives, and/or servers in communication with the devices 102-106, the router 108, and/or the content providers 110. The analysis network 112 may be configured to detect co-location of the devices 102-106 and determine content transmission from the content provider 110. The analysis network 112 may include one or more modules configured to perform the functions of the present disclosure. For example, the analysis network 112 may include an interface module 114, an attribution module 116, and an optional validation module 118. In some implementations, the interface module 114, the attribution module 116, and the optional validation module 118 may be included in the router 108.

The interface module 114 of the analysis network 112 may be configured to send and receive data to and from at least one of the devices 102-106, the router 108, and the content provider 110. The interface module 114 of the analysis network 112 may be configured to receive an identifier and location data of the devices 102-106 from the devices 102-106, the router 108, and/or the content server 110. As discussed above, the identifier may include at least one of a MAC address, a browser cookie stored on the device 102-106, an advertising ID assigned to the device 102-106, manufacturer and model of the device 102-106, an app or package used on the device 102-106, and/or any other direct (e.g., private IP address) or probabilistic device identifier. The location data may include at least one of an IP address and GPS data. The analysis network 112 may be configured to utilize the detected IP address to determine the physical location of the router 108 and the devices 102-106 connected thereto, such as the current country, state, city, neighborhood, longitude, latitude, and/or street address. For example, the analysis network 112 may be configured to access data from an ISP to correlate the IP to the physical location of the router 108. However, it is understood that connection to a common IP address does not necessarily require the devices 102-106 to be located physically proximate to each other.

In some embodiments, the interface module 114 of the analysis network 112 may be configured to receive account data from the devices 102-106, the router 108, and/or the content provider 110. The account data may include logins to an account from one or more of the devices 102-106, such as bank accounts that would not be shared with other people and/or outside of a household. The account data may also include billing information for one or more of the devices 102-106 (e.g., TV and internet service bundles). The account data may be utilized to access an identifier of the devices 102-106, location data of the devices 102-106, and/or validate household data.

In some embodiments, the interface module 114 of the analysis network 112 may be further configured to receive panel data from the devices 102-106 and/or the router 108 indicative of direct usage of the devices 102-106. For example, the panel data may include the user's web browsing activity or other online activity, such as mobile device application use. The panel data may also include user information, such as demographic information, such as name, age, gender, ethnicity, geographic location, income, familial or marital status, and/or hobbies. The panel data may further include device information, such as operating system, web browser software, and versions thereof. The panel data of the device 102-106 may be provided by the user or may be automatically received and transmitted by the software installed on the devices 102-106. Thus, the panel data may include tracked web browsing activity of a user as well as correlated demographic information and/or device information associated with the user. The panel data for an individual user and/or device 102-106 may be reported to a central entity, such as the analysis network 112, where it may be aggregated with panel data relating to other users and/or respective device 102-106.

The attribution module 116 of the analysis network 112 may be configured to compare the location data of one or more of the devices 112, and generate co-location score including a weighted value based on the number of devices with the same location data. The attribution module 116 of the analysis network 112 may also generate communication data from the weighted value, as further discussed herein.

The validation module 118 of the analysis network 112 may be configured to validate the communication data based on one or more of the account data and the panel data. The account data and the panel data may provide ground truth for the devices 102-106, but the number of devices with accessible data may be limited. The interface module 114 may transmit the household data to the content provider 112, which may transmit content to the devices 102-106 based on the household data.

Although not shown in FIG. 1, each of the devices 102-106, the router 108, the content provider 110, and the analysis network 112 may include one or more processors configured to perform the various functions of the disclosure. The processor(s) may have varying core configurations and clock frequencies. These entities may also include one or more memory devices or computer-readable media of varying physical dimensions and storage capacities (e.g., flash drives, hard drives, random access memory, etc.) for storing data, such as images, files, and program instructions for execution by one or more processors. These entities may include one or more network interfaces, such as Ethernet adapters, wireless transceivers, or serial network components for communicating over wired or wireless media using protocols, such as Ethernet, wireless Ethernet, code divisional multiple access (CDMA), time division multiple access (TDMA), etc. These communication protocols may be used to communicate between the devices 102-106, the router 108, the content provider 110, and the analysis network 112. These entities may also have one or more peripheral interfaces, such as keyboards, mice, touchpads, computer screens, touchscreens, etc. for enabling human interaction with and manipulation of the devices 102-106, the router 108, the content provider 110, and the analysis network 112.

Figure 2:
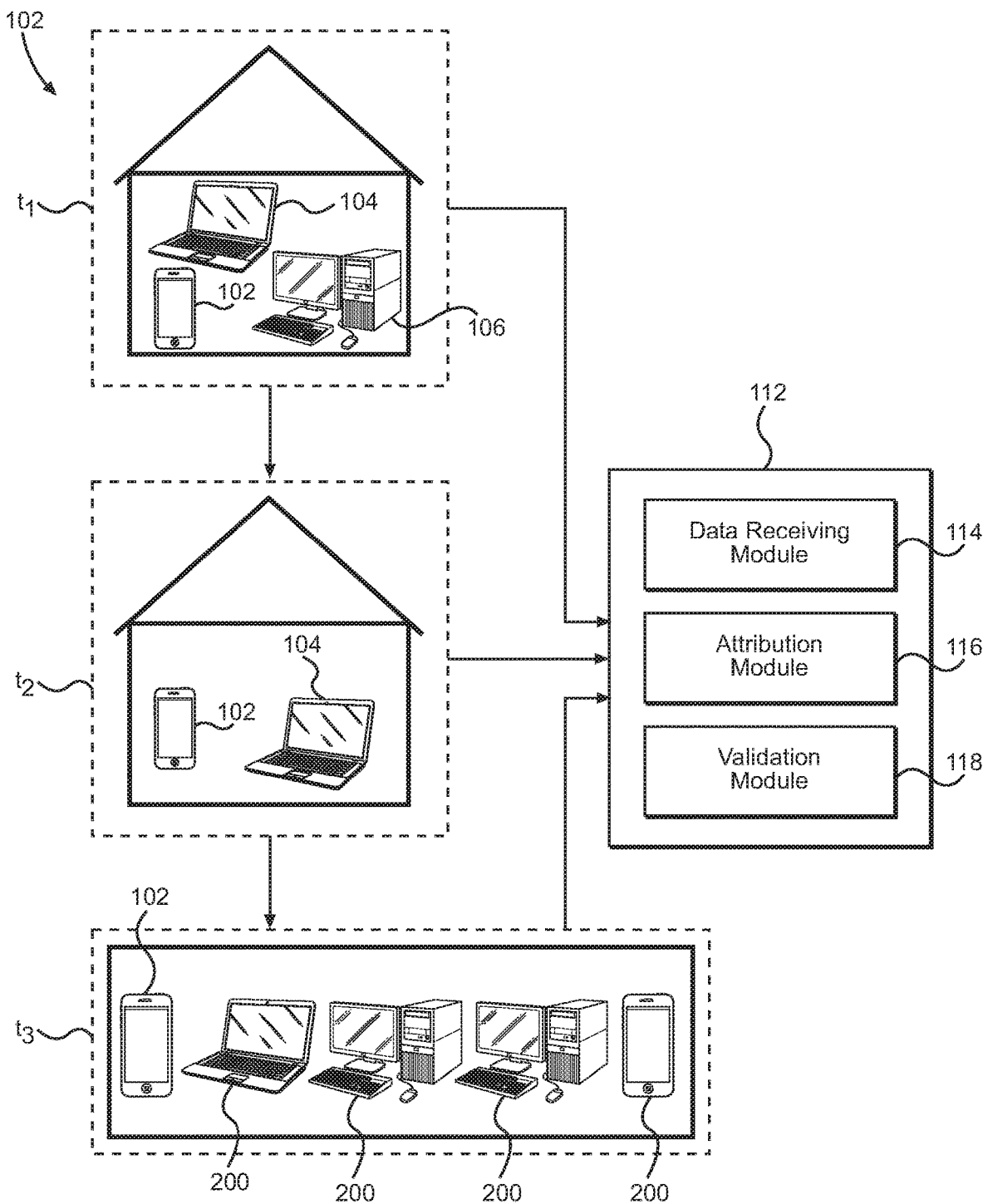
FIG. 2 illustrates a diagrammatic representation of exemplary configurations of the system of FIG. 1 at different time points.

FIG. 2 is a diagrammatic representation of exemplary configurations of the system 100 of FIG. 1 at different time points. For example, the first device 102 may connect to various networks over time along with one or more other devices. For example, as depicted in time $t_1$, the first device 102 may be connected to a household network, such as the network generated by the router 108 depicted in FIG. 1. At time $t_1$, the first device 102, the second device 104, and the third device 106 may be connected the router 108 of the household network. At time $t_2$, the first device 102 may be connected to the same household network with the second device 104, but without the third device 106. At time $t_3$, the first device 102 may be connected to a corporate network with a number of other devices 200. In some configurations, the corporate network may have over a hundred other devices 200 connected at $t_3$.

Based on the exemplary configurations of FIG. 2, the analysis network 112 may be configured to generate co-location scores and household data for the various devices. One or more components of the system 100 may also be configured to transmit content to one or more of the devices based on the household data. For example, the analysis network 112 may be configured to acquire identifiers and IP addresses from the devices of FIG. 2, and determine the connection of the devices to the network. Due to the connection of the first device 102, the second device 104, and the third device 106 with the household network at time $t_1$, the analysis network 112 may be configured to generate a relatively high co-location score for the devices 102-106. Furthermore, since the first device 102 and the second device 104 are the only devices connected at time $t_2$, the analysis network 112 may be configured to generate an optimal co-location score. On the other hand, the co-location score of the devices of $t_3$ may be below a threshold. For example, due to the number of devices connected to the network, the analysis network may determine that the network is not a household network, but a public WiFi hotspot or a private corporate network. In some embodiments, the threshold may not be predetermined and be generated by a model. Based on the co-location scores of the devices, the analysis network 112 may generate and transmit household reports to the content provider 110, which may transmit content media to the devices 102-106, as further discussed below.

Figure 3:
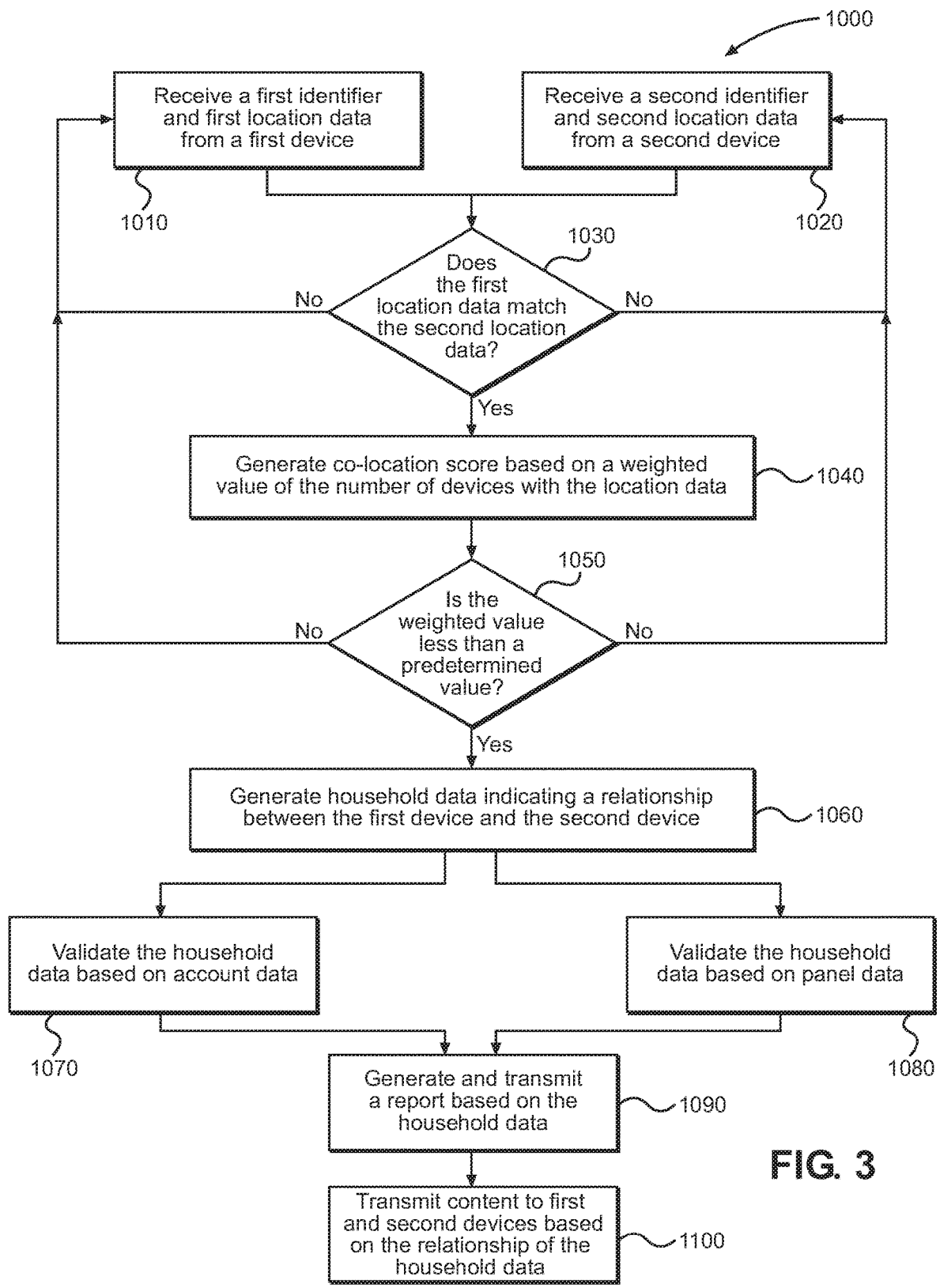
FIG. 3 illustrates an exemplary process for detecting content blocking software.

FIG. 3 illustrates an exemplary method 1000 for generating and transmitting content to the devices 102, 104 based on co-location of the devices 102, 104. Even though discussed as being primarily performed by the tag and the analysis network 112, one or more steps of the method 1000 may be performed, in conjunction or alternatively, by the devices 102, 104, the router 108, and/or the content provider 110.

In step 1010, the analysis network 112 may receive a first identifier and first location data from the first device (e.g., device 102). In step 1020, the analysis network 112 may receive a second identifier and second location data from the second device (e.g., device 104). The analysis network 112 may also receive a timestamp for each of the first and second identifier and the first and second location data. As discussed above, the identifier may include at least one of a MAC address, a browser cookie stored on the device 102, 104, an advertising ID assigned to the devices 102, 104, manufacturer and model of the devices 102, 104, an app or package (or its identifier) used on the devices 102, 104, and/or any other direct (e.g., private IP address) or probabilistic device identifier. The location data may include at least one of an IP address and GPS data. The identifiers, location data, and timestamps may be received from the devices 102, 104, the router 108, and/or the content provider 110. For example, the identifier and location data may be readily available to content provider 110 (e.g., web and app publishers) in communication with at least one of the devices 102, 104, facilitating access of the analysis network 112 to a broad range of data. The availability of the identifier and location data may allow the system 100 to determine co-location of devices 102, 104 accurately and at a large scale, both characteristics having direct implications on utility in targeted applications (e.g., on-line advertising, content customization, security and operations). The identifier and location data may, additionally or alternatively, be received through account data and/or panel data from software installed on one or more of the devices 102, 104, the router 108, and/or the content provider 110. Devices without an identifier or with an identifier created less than 24 prior to detection may be filtered out to reduce potential errors in detection.

In step 1030, the analysis network 112 may compare the first location data with the second location data to determine if there is a match. In some embodiments, step 1020 may be performed by matching an IP address of the first device 102 with an IP address of the second device 102, having a common timestamp. If the IP addresses match, the analysis network 112 may determine that the first device 102 and the second device 104 were contemporaneously connected to a common network, and the analysis network 112 may then proceed to step 1040. In some embodiments, the analysis network 112 may, additionally or alternatively, determine relationships based on geographic proximity. For example, the analysis network 112 may receive a physical address for the location data of step 1010, such as from the ISP. The analysis network 112 may receive a street address of the first device 102 and the second device 104, and determine the geographic proximity of the first device 102 and the second device 104. In another example, the analysis network 112 may compare the current city and/or neighborhood of the first device 102 and to the current city and/or neighborhood of the second device 104 to determine if they are located in the same city and/or neighborhood using, for example, a zip code. In yet another example, the analysis network 112 may receive GPS data directly from the first device 102 and the second device 104, and determine a geographic proximity of the devices 102, 104 from the GPS data. In some embodiments, a match may be determined if the geographic proximity is above a threshold, for example if the devices 102, 104 are located in the same neighborhood and/or city. For example, a match may be determined if the devices 102, 104 are within a predetermined range (e.g., 50 feet) according to acquired GPS data, such that exact location values (e.g., longitudinal and/or latitude) need not be identical. If there is no match (e.g., common IP address and/or geographic proximity), the analysis network 112 may return to steps 1010, 1020. If the analysis network 112 determines that a match exists, the analysis network 112 may proceed to step 1040.

In step 1040, the analysis network 112 may generate a co-location score including a weighted value of the number of devices with the location data. The weighted value may determine a potential relationship between the devices (e.g., 102, 104). For example, the weighted value may determine that the devices 102, 104 belong to a single person and/or to a common household, for example, because they are traveling through IP and/or geographic space together. Any function may be used that assigns a score to two devices that are observed on the same IP address close in time. The function may depend on the total number of devices on that IP in a given timeframe, and the score may be inversely proportional to the number of devices on the IP. As exemplified in Equation (1), at each time (t) for the total number of devices (i, j) at a common IP address (k), the weighted value (S) of the co-location score may be determined by dividing 2 by the total number of devices on the IP network (k). Equation (1) can be modified, for example, using the inverse of the number of devices may be squared to further stress the importance of a low volume IP address. The weighted value (S) may then be assigned to the devices with the IP address.

$$S_{i,j}(t,k) = 2/(\text{total number of devices on IP } k \text{ at time } t) \quad (1)$$

For example, revisiting FIG. 2, the first weighted value of the system 100 at time $t_1$ may be ⅔ because the first device 102, the second device 104, and the third device 106 are the only devices connected to the same network. Accordingly, the first weighted value may be assigned to the first device 102, the second device 104, and the third device 106. The second weighted value of the system 100 at time $t_2$ may have a value of one because the first device 102 and the second device 104 are the only devices connected to the network, and the second weighted value may be assigned to the first device 102 and the second device 104. The third weighted value of the system 100 at time $t_3$ may be substantially smaller because of the increased number of devices connected to the corporate network. The third weighted value may be attributed to the devices connected to the corporate network, including the first device 102. Although a scalar value is discussed, the system may, additionally or alternatively, determine a vector of values that indicated multiple determinations of shared activity. Such a vector may include the weighted value (S) in addition to other determinations, such as shared login information according to panel data. The vector may provide a more detailed perspective on relationships that lead to a more accurate representation of devices associated by ownership of an individual or a household.

Similar functions to determine the weighted value (S) may be performed based on the geographic proximity of the devices 102, 104. For example, Equation (1) may be applied to the total number of devices 102, 104 are within a 100 feet of the first device 102 based on GPS or ISP data. The larger the number of devices 102, 104 within proximity, the less of a co-location score (S) the devices 102, 104 will be attributed. On the other hand, if the devices 102, 104 are co-located geographically alone or with few other devices, the devices 102, 104 may receive a high co-location score (S). In any case, the analysis network 112 may receive a tuple of (IP address, device identifier, and timestamp) per device i, j and generate an output of (device identifier i, device identifier j, and weighted value, $S_{i,j}$) in step 1040.

In step 1050, for each of the time points (t) of Step 1040, the analysis network 112 may compare the weighted values to a threshold. The threshold may be predetermined based on a predetermined number of devices (e.g., greater than 20 devices) with the location data at a common time point. For example, the analysis network 112 may filter out the co-location score of $t_3$ (FIG. 2) because the devices are connected to a corporate account with greater than 20 devices. The threshold may be a non-zero value, but in some embodiments, the threshold may be zero, such that step 1050 is omitted. It is also contemplated that step 1050 may be performed prior to step 1040, such that the co-location scores are only determined for networks having a number devices below a threshold. It is also contemplated that the threshold may not be predetermined and may be generated by a model. Step 1050 may be similar performed on co-location scores (S) based on geographic proximity.

In step 1060, the analysis network 112 may generate household data indicating a relationship between the devices 102, 104. For example, the co-location scores (S) for the devices (i, j) at each of the time points (t) may be accumulated in time and across IP space to determine a compiled co-location score, as exemplified in Equation (2).

$$S_{i,j} = \sum_{t,k} S_{i,j}(t,k) \quad (2)$$

For example, if two devices are alone together on a single IP over a period of time, the two devices (e.g., first device 102 and second device 104) may receive a compiled location score of one over that time period. In that sense, the longer the first and second devices 102, 104 are on a common network, the higher the compiled co-location score for the first and second devices 102, 104. Furthermore, the less number of other devices connected to the same network as the first and second devices 102, 104, the higher the compiled co-location score for the first and second devices 102, 104. For example, the compiled co-location score for the first device 102 and the second device (based on $t_1$, $t_2$, $t_3$ of FIG. 2) may be 1.333. In some embodiments, the compiled co-location score is normalized based on the number of time points. The compiled co-location scores may determine personal (e.g., user-specific) relationships and/or household relationships between the first and second devices 102, 104. The collection of devices may be referred to as households because they often approximate groupings of devices that belong to users from the same physical household or small workplace. However, the households of the disclosure are not limited to physical households or workplaces. Step 1060 may be similar performed on co-location scores (S) based on geographic proximity. For example, the geographic proximity data may be utilized to supplement the IP address data in order to provide more robust relationships between devices 102, 104 of the same physical household. Alternatively, the geographic proximity data may be utilized to establish, for example, neighborhood and/or city data of the devices 102, 104.

In step 1070, the analysis network 112 may validate and/or reinforce the household data based on account data. The account data may be received and transmitted from the devices 102, 104, the router 108, and/or the content provider 110. The account data may validate the household data with high confidence, based on the devices 102, 104 commonly accessing data that would not normally be shared. For example, the account data may include logins to an account from one or more of the devices 102, 104, such as bank accounts that would not be shared with other people and/or outside of a household. The account data may also include billing information for one or more of the devices 102, 104 (e.g., TV and internet service bundles). Although the account data may not necessarily exclude relationships between the devices 102, 104, the account data may validate and/or reinforce relationships established in the household data. The account data may also provide more robust analysis of the devices 102, 104, for example, supplementing the identifiers with detailed user information.

In step 1080, the analysis network 112 may validate and/or reinforce the household data based on panel data. The panel data may be received and transmitted from software installed on the devices 102, 104 and/or the router 108. The panel data may validate the household data with high confidence, based on ground data. The panel data may include user information and browser activity of the devices 102, 104, as further discussed herein. Although the panel data may not necessarily exclude relationships between devices 102, 104, the panel data may validate and/or reinforce relationships established in the household data. The panel data may also provide more robust analysis of the devices 102, 104, for example, supplementing the identifiers with detailed user information. In some embodiments, the panel data may be used to generate models of households that enable thresholds for relationships or household scores to be tuned.

In step 1090, the analysis network 112 may generate and transmit reports based on the household data. The reports may include relationships between the devices 102, 104, such as the devices 102, 104 having a relationship with a common user and/or household. The reports may be transmitted to the content provider 110. In some embodiments, the analysis network 112 may also synchronize cookies for the first device 102 and the second device 104, such that they are identified by the same identifier. The cookie synchronizing may reduce subsequent processing time and optimize the identifications of the devices 102, 104.

In step 1100, the content provider 110 may transmit content to the first and second devices 102, 104 based on the relationship of the household data. In some embodiments, the content provider 110 may transmit advertisement content to the devices 102, 104 based on the relationship. For example, if a user is shown an ad on the first device 102 and then determined to be using the second device 104 that she owns, the content provider 110 may show the same ad on the second device 104. In another example, the advertisement content may be based on the geographic locality of the devices 102, 104, such as local businesses. The system 100 may also be configured to measure the impact of cross-media advertising (e.g., on both television and digital devices). In some embodiments, the content provider 110 may customize content, such as sync calendars or suggest common media content (e.g., streaming movies) to the devices 102, 104. The content provider 110 may also transmit content for security and/or operation. For example, the content provider may be configured to track the first device 102 and notify the second device 104 when certain conditions are met. For instance, the second device 104 may be notified when the first device 102 is connected to a suspicious or unknown IP address and/or accessing restricted content (e.g., parental controls). The method 1000 may be performed repeatedly on multiple different pairs of devices. The method 1000 may also be performed continuously or intermittently (e.g., daily, weekly, or monthly) to update the household data based on active and inactive relationships. For example, the method 1000 may determine when the relationships between one of the devices 102, 104 and the location is stale (e.g., when a user changes street addresses) based on the updates. The transmission of content may also include internal transmission of one or more components of the system 100. For example, the transmission of content may be between one or more processors, hard drives, and/or servers of analysis network 112. The transmission of content may include processor-to-processor transmission, processor-to-hard drive transmission, hard drive-to-hard drive transmission, and/or server-to-server transmission internal of the analysis network 112.

One or more of software modules incorporating the methods described above can be integrated into a computer system or non-transitory computer-readable media. Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A computerized method of transmitting content to a first device and a second device, the method comprising:
   receiving a first identifier and first location data of the first device, wherein the first location data includes a first IP address of the first device;
   receiving a second identifier and second location data of the second device, wherein the second location data includes a second IP address of the second device;
   comparing the first location data with the second location data, including determining that the first IP address is the same as the second IP address;
   generating, in response to the comparison of the first location data and the second location data, a co-location score, and assigning the co-location score to the first device and the second device, wherein the co-location score is a weighted value inversely proportional to a number of devices with the same IP address, the weighted value corresponding to the first device and the second device;
determining that the co-location score is greater than a predetermined threshold;
generating, in response to the determination that the co-location score is greater than the predetermined threshold, household data indicative of a relationship between the first device and the second device; and
generating and transmitting a report indicating the relationship to a content provider that transmits content to the first device and the second device.

2. The computerized method of claim 1, wherein:
receiving the first identifier includes receiving at least one of a first web cookie and a first advertising ID of the first device, and
receiving the second identifier includes receiving at least one of a second web cookie and a second advertising ID of the second device.

3. The computerized method of claim 1, wherein:
receiving the first location data includes receiving at least one of a first IP address and first GPS data, and
receiving the second location data includes receiving at least one of a second IP address and second GPS data.

4. The computerized method of claim 1, wherein the predetermined threshold is based on a predetermined number of devices with the same IP address.

5. The computerized method of claim 1, wherein:
generating the household data comprises assigning the first device and the second device to a household, and
transmitting content includes transmitting advertising content to the first device and the second device.

6. The computerized method of claim 1, further comprising syncing a first cookie of the first device with a second cookie of the second device.

7. The computerized method of claim 1, further comprising:
receiving first account data for the first device from one or more third parties;
receiving second account data for the second device from one or more third parties; and
validating the generated household data based on the account data for the first and second devices.

8. The computerized method of claim 7, wherein:
receiving the first account data includes receiving a first array of accounts that have been logged in with the first device,
receiving the second account data includes receiving a second array of accounts that have been logged in with the second device, and
validating the generated household data includes determining that the first array substantially matches the second array.

9. The computerized method of claim 1, further comprising:
accessing panel data that directly indicates activity of a router in communication with the first device and the second device; and
validating the generated household data based on an established relationship of the first device and the second device in the panel data.

10. A system, comprising:
at least one processor;
at least one memory storing instructions that, when executed, cause the at least one processor to perform a method, the method comprising:
receiving a first identifier and first location data of a first device, wherein the first location data includes a first IP address of the first device;
receiving a second identifier and second location data of a second device, wherein the second location data includes a second IP address of the second device;
comparing the first location data with the second location data, including determining that the first IP address is the same as the second IP address;
generating, in response to the comparison of the first location data and the second location data, a co-location score, and assigning the co-location score to the first device and the second device, wherein the co-location score is a weighted value inversely proportional to a number of devices with the same IP address, the weighted value corresponding to the first device and the second device;
determining that the co-location score is greater than a predetermined threshold;
generating, in response to the determination that the co-location score is greater than the predetermined threshold, household data indicative of a relationship between the first device and the second device; and
generating and transmitting a report indicating the relationship to a content provider that transmits content to the first device and the second device.

11. The system of claim 10, wherein the predetermined threshold is based on a predetermined number of devices with the same IP address.

12. The system of claim 10, wherein:
generating the household data comprises assigning the first device and the second device to a household and determining at least one aspect of the household, and
transmitting content includes transmitting advertising content to the first device and the second device based on the at least one aspect.

13. The system of claim 10, wherein the method further comprises:
receive first account data for the first device from one or more third parties;
receive second account data for the second device from one or more third parties; and
validating the generated household data based on the account data for the first and second devices.

14. A non-transitory computer-readable medium storing instructions which, when executed, cause one or more processors to perform a method, the method comprising:
receiving a first identifier and first location data of a first device, wherein the first location data includes a first IP address of the first device;
receiving a second identifier and second location data of a second device, wherein the second location data includes a second IP address of the second device;
comparing the first location data with the second location data, including determining that the first IP address is the same as the second IP address;
generating, in response to the comparison of the first location data and the second location data, a co-location score, and assigning the co-location score to the first device and the second device, wherein the co-location score is a weighted value inversely proportional to a number of devices with the same IP address, the weighted value corresponding to the first device and the second device;
determining that the co-location score is greater than a predetermined threshold;

generating, in response to the determination that the co-location score is greater than the predetermined threshold, household data indicative of a relationship between the first device and the second device; and generating and transmitting a report indicating the relationship to a content provider that transmits content to the first device and the second device.

15. The non-transitory computer-readable medium of claim 14, wherein the predetermined threshold is based on a predetermined number of devices with the same IP address.

16. The non-transitory computer-readable medium of claim 14, wherein:

generating the household data comprises assigning the first device and the second device to a household and determining at least one aspect of the household, and transmitting content includes transmitting advertising content to the first device and the second device based on the at least one aspect.

17. The non-transitory computer-readable medium of claim 14, wherein the method further comprises:

receive first account data for the first device from one or more third parties;

receive second account data for the second device from one or more third parties; and validating the generated household data based on the account data for the first and second devices.

\* \* \* \* \*